(12) United States Patent
Hojeij et al.

(10) Patent No.: US 10,856,172 B2
(45) Date of Patent: Dec. 1, 2020

(54) METHOD AND APPARATUS FOR USER DISTRIBUTION TO SUB BANDS IN NOMA SYSTEMS

(71) Applicants: INSTITUT MINES-TELECOM / TELECOM BRETAGNE, Brest (FR); Université Libanaise, Beirut (LB); Université Saint-Esprit de Kaslik, Jounieh (LB)

(72) Inventors: Marie-Rita Hojeij, Mont Liban (LB); Joumana Farah, Mont Liban (LB); Charbel Abdel Nour, Brest (FR); Catherine Douillard, Brest (FR)

(73) Assignees: INSTITUT MINES-TELECOM / TELECOM BRETAGNE, Brest (FR); UNIVERSITÉ LIBANAISE, Beirut (LB); UNIVERSITÉ SAINT-ESPRIT DE KASLIK, Jounieh (LB)

( * ) Notice: Subject to any disclaimer, the term of this patent is extended or adjusted under 35 U.S.C. 154(b) by 0 days.

(21) Appl. No.: 15/835,631

(22) Filed: Dec. 8, 2017

(65) Prior Publication Data
US 2018/0176815 A1    Jun. 21, 2018

(30) Foreign Application Priority Data
Dec. 19, 2016   (EP) .................................... 16306722

(51) Int. Cl.
*H04W 28/02*    (2009.01)
*H04W 72/12*    (2009.01)
(Continued)

(52) U.S. Cl.
CPC ....... *H04W 28/0236* (2013.01); *H04W 28/18* (2013.01); *H04W 28/26* (2013.01); *H04W 72/1215* (2013.01); *H04W 72/1226* (2013.01); *H04W 72/1236* (2013.01); *H04B 7/0626* (2013.01); *H04L 25/0204* (2013.01); *H04W 72/0453* (2013.01); *H04W 72/121* (2013.01)

(58) Field of Classification Search
CPC .. H04W 72/1231; H04W 28/22; H04W 76/10
See application file for complete search history.

(56) References Cited

U.S. PATENT DOCUMENTS 9,071,294 B2 * 6/2015 Sato .................. H04W 72/1247
2006/0056451 A1   3/2006 Yano et al.
(Continued)

OTHER PUBLICATIONS

European Search Report for 16306722.6 dated Jul. 14, 2017.
(Continued)

*Primary Examiner* — Melanie Jagannathan
(74) *Attorney, Agent, or Firm* — Meagher Emanuel Laks Goldberg & Liao, LLP (57) ABSTRACT

A mechanism for attributing users to a plurality of sub bands in a time slot t in a multiple access communications system, said method comprising assigning a combination of users to a sub band on a Proportional Fairness basis, that is to say whichever combination of users maximizes a Proportional Fairness performance metric for that channel, where the performance metric is weighted by a weighting factor reflecting the difference for that user between a target throughput and a projected throughput.

14 Claims, 7 Drawing Sheets

(51) Int. Cl.
*H04W 28/18* (2009.01)
*H04W 28/26* (2009.01)
*H04B 7/06* (2006.01)
*H04L 25/02* (2006.01)
*H04W 72/04* (2009.01)

(56) References Cited

U.S. PATENT DOCUMENTS

| | | | | |
|---|---|---|---|---|
| 2007/0155395 | A1* | 7/2007 | Gopalakrishnan | H04W 28/18 455/453 |
| 2009/0016275 | A1* | 1/2009 | Liu | H04W 72/1273 370/329 |
| 2012/0026910 | A1* | 2/2012 | Ko | H04W 72/1231 370/252 |
| 2013/0225220 | A1* | 8/2013 | Dotzler | H04W 72/1226 455/509 |
| 2014/0161054 | A1* | 6/2014 | Sandberg | H04B 7/024 370/329 |
| 2015/0312074 | A1* | 10/2015 | Zhu | H04L 27/2627 370/329 |
| 2016/0088626 | A1* | 3/2016 | Seyama | H04W 72/0453 370/329 |
| 2017/0257879 | A1* | 9/2017 | Kang | H04W 74/0816 |
| 2017/0265145 | A1* | 9/2017 | Benjebbour | H04W 52/24 |
| 2017/0279725 | A1* | 9/2017 | Lee | H04W 28/14 |
| 2017/0289984 | A1* | 10/2017 | Baligh | H04L 5/0094 |
| 2018/0070225 | A1* | 3/2018 | Soldati | H04W 72/0406 |
| 2019/0044591 | A1* | 2/2019 | Sano | H04B 7/0456 |

OTHER PUBLICATIONS

Eddo Zeina et al: "Evaluation of Intra-Subband Power Allocation for a Downlink Non-Orthogonal Multiple Access (NOMA) System", 2016 IEEE GLOBECOM Workshops (GC Wkshps), IEEE, Dec. 4, 2016 (Dec. 4, 2016), pp. 1-7.

Huawei et al: "System-level performance of MUST schemes", 3GPP Draft; R1-153799, 3rd Generation Partnership Project (3GPP), Mobile Competence Centre ; 650, Route Des Lucioles ; F-86921 Sophia-Antipolis Cedex ; France, vol. RAN WG1, no. Beijing, China; Aug. 24, 2015-Aug. 28, 2015, Aug. 23, 2015 (Aug. 23, 2015).

Yang C, Wang W, Qian Y, Zhang X. A weighted proportional fair scheduling to maximize best-effort service utility in multicell network. InPersonal, Indoor and Mobile Radio Communications, 2008. PIMRC 2008. IEEE 19th International Symposium on Sep. 15, 2008, pp. 1-5.

Umehara J, Kishiyama Y, Higuchi K. Enhancing user fairness in non-orthogonal access with successive interference cancellation for cellular downlink. InCommunication Systems (ICCS), 2012 IEEE International Conference on 2012 Nov. 21, pp. 324-328.

Saito Y, Benjebbour A, Kishiyama Y, Nakamura T. System-level performance evaluation of downlink non-orthogonal multiple access (NOMA). InPersonal Indoor and Mobile Radio Communications (PIMRC), 2013 IEEE 24th International Symposium on Sep. 8, 2013, pp. 611-615.

Mehrjoo M, Awad MK, Dianati M, Shen XS. Design of fair weights for heterogeneous traffic scheduling in multichannel wireless networks. IEEE Transactions on Communications. Oct. 2010;58(10), pp. 2892-2902.

Gueguen C, Baey S. Compensated proportional fair scheduling in multiuser OFDM wireless networks. InNetworking and Communications, 2008. WIMOB'08. IEEE International Conference on Wireless and Mobile Computing, Oct. 12, 2008, pp. 119-125.

Endo Y, Kishiyama Y, Higuchi K. Uplink non-orthogonal access with MMSE-SIC in the presence of inter-cell interference. InWireless Communication Systems (ISWCS), 2012 International Symposium on Aug. 28, 2012, pp. 261-265.

* cited by examiner

METHOD AND APPARATUS FOR USER DISTRIBUTION TO SUB BANDS IN NOMA SYSTEMS

FIELD OF THE INVENTION

The present invention relates to the user distribution to sub bands in Non-Orthogonal Multiple Access (NOMA) communications systems.

BACKGROUND OF THE INVENTION

With the proliferation of internet applications, it is expected that the mobile traffic volume supported by communication networks by 2020 will be 10 times larger than that supported today. To respond favourably to such constraints while keeping a high level of user quality of experience, system capacity and user fairness should be largely improved for the future 5th generation (5G) mobile communication systems. To this end, Non-Orthogonal Multiple Access (NOMA) has recently emerged as a promising candidate for future radio access. By exploiting an additional multiplexing domain, the power domain, NOMA allows the cohabitation of multiple users per sub band at the transmitter side, on top of the modulation layer which may be Othogonal Frequency Division Multiplex (OFDM), Filter Bank Multi-Carrier (FBMC), Universal Filtered Multicarrier (UFMC), or other multiple carrier scheme, and relies on Successive Interference Cancellation (SIC) at the receiver side. An attractive feature of NOMA is that it targets the improvement of system capacity while achieving user fairness. Therefore, most of the prior art dealing with NOMA considers the proportional fairness (PF) scheduler as a multiuser scheduling scheme for the trade-off between total user throughput or data rate and the user fairness that it provides. Examples of power allocation algorithms, jointly implemented with a NOMA-based PF scheduler used for the selection of users to be assigned to each sub band are presented for example in "Uplink non-orthogonal access with MMSE-SIC in the presence of inter-cell interference" by Y. Endo, Y. Kishiyama, and K. Higuchi. in proc. 2012 IEEE Int. Symp. on. Wireless Commun. Syst, 2012, or "System-Level Performance of Downlink Non-orthogonal Multiple Access (NOMA) Under Various Environments" by Y. Saito, A. Benjebbour, Y. Kishiyama, and T. Nakamura in proc. IEEE 81st VTC, 2015.

In the article by Umehara, J., Kishiyama, Y., Higuchi, K. entitled "Enhancing user fairness in non-orthogonal access with successive interference cancellation for cellular downlink", in Proc. International Conference on Communication Systems (ICCS 2012), the authors propose a weighted PF-based multiuser scheduling scheme in a non-orthogonal access downlink system. A frequency block access policy is proposed for cell-interior and cell-edge user groups in fractional frequency reuse (FFR), with significant improvements in the user fairness and system frequency efficiency.

In the article by Mehrjoo, M., Awad, M. K., Dianati, M., Xuemin, S., entitled "Design of Fair Weights for Heterogeneous Traffic Scheduling in Multichannel Wireless Networks," IEEE Trans. Commun., 58(10) (2010), fair weights have been implemented for opportunistic scheduling of heterogeneous traffic types for OFDMA networks. For designing fair weights, the proposed scheduler takes into account average channel status and resource requirements in terms of traffic types. Simulation analysis demonstrates the efficiency of the proposed scheme in terms of resource utilization, and flexibility to network characteristics change due to user mobility.

In the article by Gueguen, C., Baey, S., entitled "Compensated Proportional Fair Scheduling in Multiuser OFDM Wireless Networks", in Proc. IEEE International conference on Wireless Mobile Computing, Networking Communication (2008), the problem of fairness deficiency encountered by the PF scheduler when the mobiles experience unequal path loss is investigated. To mitigate this issue, a modified version of the PF scheduler that introduces distance compensation factors has been proposed. It was shown that this solution achieves both high capacity and high fairness.

In the article by Yang, C., Wang, W., Qian, Y., Zhang X., entitled "A Weighted Proportional Fair Scheduling to Maximize Best-Effort Service Utility in Multicell Network, in Proc. IEEE International Symposium on Personal, Indoor and Mobile Radio Communications (2008), a weighted proportional fair algorithm is proposed in order to maximize best-effort service utility. The reason behind introducing weight factors to the PF metric is to exploit the inherent near-far diversity given by the path loss. The proposed algorithm enhances both best-effort service utility and throughput performance while maintaining similar complexity when compared to the PF metric.

If a downlink system with a single transmitter and receiver antenna is considered, the system consists of K users per cell, with a total system bandwidth B divided into S sub bands, and a maximum allowable transmit power Pmax by the Base Station. Among the K users, a set of users $U_s = \{k1, k2, \ldots, k_n, \ldots, k_{n(s)}\}$, is selected to be scheduled over each frequency sub band s, ($1 \leq s \leq S$). n(s) indicates the number of users non-orthogonally scheduled at sub band s. The Successive Interference Canceller (SIC) process as described in Fundamentals of Wireless Communication, Cambridge University Press, 2005 by D. Tse, and P. Viswanath, is conducted at the receiver side, and the optimum order for user decoding is in the increasing order of the users' channel gains normalized by the noise and inter-cell interference $$\frac{h_{s,k_n}^2}{n_{s,k_n}}$$

where $h_{s,k_n}^2$ is the equivalent channel gain, at sub band s, between user $k_n$ and the base station BS, and $n_{s,k_n}$ the average power of the received Gaussian noise plus intercell interference by user $k_n$. Assuming successful decoding and no SIC error propagation, and supposing that inter-cell interference is randomized such that it can be considered as white noise, the throughput of user $k_n$, at sub band s, $R_{s,k_n}$, is given by:

$$R_{s,k_n} = \frac{B}{S} \log_2 \left( 1 + \frac{h_{s,k_n}^2 P_{s,k_n}}{\sum_{j \in N_s, \frac{h_{s,k_n}^2}{n_{s,k_n}} < \frac{h_{s,k_j}^2}{n_{s,k_{nj}}}} h_{s,k_n}^2 P_{s,k_j} + n_{s,k_n}} \right) \quad (1)$$

The transmit power allocation constraint is represented by $$\sum_{s=1}^{S} P_s = P_{max}, \text{ with } P_s = \sum_{n=1}^{n(s)} P_{s,k_n} \quad (2)$$

Where $P_s$ denotes the amount of allocated power on sub band s.

Since the scheduler in NOMA may allocate a sub band to more than one user simultaneously, the user scheduling policy affects system efficiency and user fairness. The "Proportional Fairness" (PF) scheduler as introduced by the prior art references above is considered to achieve a trade-off between these two metrics.

The objective of the PF scheduler is to maximize the long term averaged user rates, in order to ensure balance between cell throughput and user fairness. This scheduling policy has been adopted in the majority of proposed NOMA implementations. The scheduling algorithm keeps track of the average throughput $T_k(t)$ of each user in a past window of length $t_c$, where $t_c$ defines the throughput averaging time window (over a specified number of previous time slots). $T_k(t)$ is defined as:

$$T_k(t+1) = \left(1 - \frac{1}{t_c}\right) T_k(t) + \frac{1}{t_c} \sum_{s=1}^{S} R_{s,k}(t) \quad (3)$$

where $R_{s,k}(t)$ represents the throughput of user k on sub band s, at time instance t. This is calculated based on Eq. (1) above, and can equal zero if user k is not scheduled on sub band s.

For each sub band s, all possible candidate user sets are considered, and the set of scheduled users $U_s$ is chosen in such a way to maximize the PF scheduling metric:

$$U_s = \operatorname*{argmax}_{U} \sum_{k \in U} \frac{R_{s,k|U}(t)}{T_k(t)} \quad (4)$$

A scheduler applying this approach gives each user a priority inversely proportional to its historical rate $T_k(t)$. If $T_k(t)$ is high, user k will possibly not be assigned any transmission rate for several time slots. This is problematic for applications requiring quasi-constant Quality of Experience (QoE), and may call for deep buffering. By the same token, this approach may raise difficulties for applications requiring low latency transmission.

In general, when using PF scheduling for user allocation in NOMA schemes, a large user throughput gain can be observed for users near the base station compared to orthogonal multiple access (OMA) schemes, but almost no gain is achieved for cell edge users.

It is desirable to identify a mechanism for resolving these issues and providing a method for a more optimal attribution of users.

SUMMARY OF THE INVENTION

In accordance with the present invention in a first aspect there is provided a user selection apparatus for use in a multiple access communications system for the selection of users from a pool of candidate users for allocation to a plurality of sub bands in a time slot t, the apparatus being adapted to assign to each sub band whichever combination of users maximizes a Proportional Fairness performance metric for that respective sub band, where the performance metric is weighted by a weighting factor reflecting the difference for each user between a target throughput and an projected throughput.

In accordance with a development of the first aspect, the performance metric may correspond to the sum across all users in a respective combination of users of the values obtained by dividing the product of an achievable throughput value for that user on that sub band and a weighting factor reflecting the difference between a projected throughput determined for that user in the current respective combination of users within the time slot t and a target throughput defined for that respective user in the current possible combination, by the average throughput achieved by the corresponding user over a predefined historical period.

In accordance with a further development of the first aspect, the user selection apparatus may be adapted to select each sub band in the time slot t in turn and to designate this selected sub band to an achievable user throughput calculator and a performance metric calculator, wherein the user throughput meter is adapted to determining the average throughput achieved by each user over a predefined historical period, an achievable user throughput calculator adapted to determine the achievable throughput for each user for each possible combination of users on selected sub band in the time slot t, the performance metric calculator is adapted to calculate the performance metric for each possible combination of users, the performance metric calculator comprising:

a projected throughput calculator adapted to determine a projected throughput equal to the sum of the achievable throughputs for each user on each sub band to which one or more users has been attributed, and a weighting factor calculator adapted to determine the weighting factor reflecting the difference between the projected throughput determined for each respective user in the current possible combination of users within the time slot t and a target throughput defined for that respective user in the current possible combination by the projected throughput calculator, and wherein the performance metric calculator is adapted to obtain the performance metric for the current possible combination of users for the selected sub band by summing across all users in that combination the values obtained by dividing the product of the corresponding achievable throughput value for that user on the selected sub band output by the achievable throughput calculator and the corresponding weighting factor output by the weighting factor calculator, by the average throughput achieved by the corresponding user over the predefined historical period output by the user throughput meter, the user selection apparatus being further adapted to select for the selected sub band whichever combination of users achieves the highest respective performance metric output by the performance metric calculator for that sub band, and wherein the user selection apparatus is further adapted to provide input values to the user throughput meter, the achievable user throughput calculator and the performance metric calculator to obtain attributed to performance metric values permitting the assignment of users to each sub band.

In accordance with the present invention in a second aspect there is provided a method for attributing users to a plurality of sub bands in a time slot t in a multiple access communications system, the method comprising assigning to each sub band whichever combination of users maximizes a Proportional Fairness performance metric for that respective sub band, where the performance metric is weighted by a weighting factor reflecting the difference for each user between a target throughput and a projected throughput.

In accordance with a development of the second aspect, the performance metric may correspond to the sum across all users in a respective combination of users of the values obtained by dividing the product of an achievable throughput value for that user on that sub band and a weighting factor reflecting the difference between a projected throughput determined for that user in the current respective combination of users within the time slot t and a target throughput defined for that respective user in the current possible combination, by the average throughput achieved by the corresponding user over a predefined historical period.

In accordance with a further development of the second aspect, the method may comprise the steps of:

determining an average achieved throughput by each user over a predefined historical period, determining an achievable throughput for each user for each possible combination of users on a first sub band in the time slot t, calculating the performance metric for each possible combination of users by:

for each user, determining a projected throughput equal to the sum of the achievable throughputs for the user on each sub band to which the user has been attributed, determining a weighting factor reflecting the difference between the projected throughput determined for each respective user in the current possible combination of users within the time slot t and a target throughput defined for that respective user in the current possible combination, obtaining the performance metric for the current possible combination of users for the first sub band by summing across all users in that combination the values obtained by dividing the product of the corresponding achievable throughput value for that user on that sub band and the corresponding weighting factor, by the average throughput achieved by the corresponding user over the predefined historical period, and selecting for the first sub band whichever combination of users achieves the highest respective performance metric for that sub band, and repeating each preceding step for a further sub band until users have been attributed to each sub band.

In accordance with a further development of the second aspect, the multiple access communications system may be a Non Orthogonal Multiple Access (NOMA) system, whereby each possible combination of users comprises a plurality of users.

In accordance with a further development of the second aspect, the multiple access communications system may be an Orthogonal Multiple Access (OMA) system, whereby each possible combination of users comprises a single user.

In accordance with a further development of the second aspect, at the step of calculating a performance metric for each possible combination of users the average throughput achieved by the corresponding user over a predefined historical period may be taken to be the average throughput achieved by the corresponding user over a predefined historical period preceding the current time slot t.

In accordance with a further development of the second aspect, the weighting factor may be computed as the sum of the difference between the projected throughput determined for each respective user within a current time, slot t and a target throughput defined for that respective user, across all users in the currently considered possible combination, and the performance metrics for each user may be calculated using the same weighting factor.

In accordance with a further development of the second aspect, the weighting factor may be computed as the difference between the projected throughput determined for each respective user within a current time slot t and a target throughput defined for that respective user, and the performance metrics for each user may be calculated using the respective weighting factor corresponding to that user.

In accordance with a further development of the second aspect, the target throughput may be fixed as a multiple (b) of the average throughput per user achieved across all sub bands over a second predefined historical period preceding a current timeslot t, where the multiple is any value greater than one.

In accordance with a further development of the second aspect, the multiple (b) may be defined for each user.

In accordance with a further development of the second aspect, the multiple (b) may be defined for each user from a plurality of predefined service quality levels, each level being associated with a respective value of the multiple.

In accordance with the present invention in a third aspect there may be provided an apparatus adapted to implement the steps of the second aspect.

In accordance with the present invention in a fourth aspect there may be provided a computer program adapted to implement the steps of the second aspect.

BRIEF DESCRIPTION OF THE DRAWINGS

The above and other advantages of the present invention will now be described with reference to the accompanying drawings, in which.

DETAILED DESCRIPTION

As discussed above, allocation of power to sub bands, and amongst users within a sub band has important implications for throughput values, however this is beyond the scope of the present invention. In the following examples it is generally assumed that power is distributed equally amongst sub bands, although there are many alternative approaches of allocation of power to sub bands (such as waterfilling), and amongst users (for example FPA—Fixed power allocation, FTPA—fractional transmit power allocation or Full Search Power Allocation) within a sub band, all of which are compatible with and encompassed in the present disclosure.

In order to further improve the achieved system performance in NOMA, the problem of optimally distributing users among sub bands should be addressed. This may lead to improved user fairness and/or increase the achieved system throughput.

Accordingly, it is proposed to modify the PF metric expression to take into account the status of the current assignment in time slot t.

Specifically there may be provided a method for attributing users to a plurality of sub bands in a time slot t in a multiple access communications system, the method comprising assigning to each sub band whichever combination of users maximizes a Proportional Fairness performance metric (for example as described with reference to FIG. 1 above) for that respective sub band, where the performance metric is weighted by a weighting factor reflecting the difference (as discussed below) for each user between a target throughput and a projected throughput.

The performance metric may correspond to the sum across all users in a respective combination of users of the values obtained by dividing the product of an achievable throughput value for that user on that sub band and a weighting factor reflecting the difference between a projected throughput determined for that user in the current respective combination of users within the time slot t and a target throughput defined for that respective user in the current possible combination, by the average throughput achieved by the corresponding user over a predefined historical period.

Compared to conventional PF scheduling, the proposed enhanced allocation technique offers:
Global throughput increase,
Higher level of fairness between users (both long-term and short-term fairness),
The possible delivery of different levels of quality of Experience (QoE):
Same target QoE for all users: higher level of fairness between users
Different levels of QoE (premium services): high level of fairness between users with the same QoE
Steadier user throughputs (deep buffering no longer required)
Only a small increase in complexity compared to the conventional PF scheduler (computation of additional weights)

The described approach is applicable to both NOMA and OMA schemes

Figure 1:
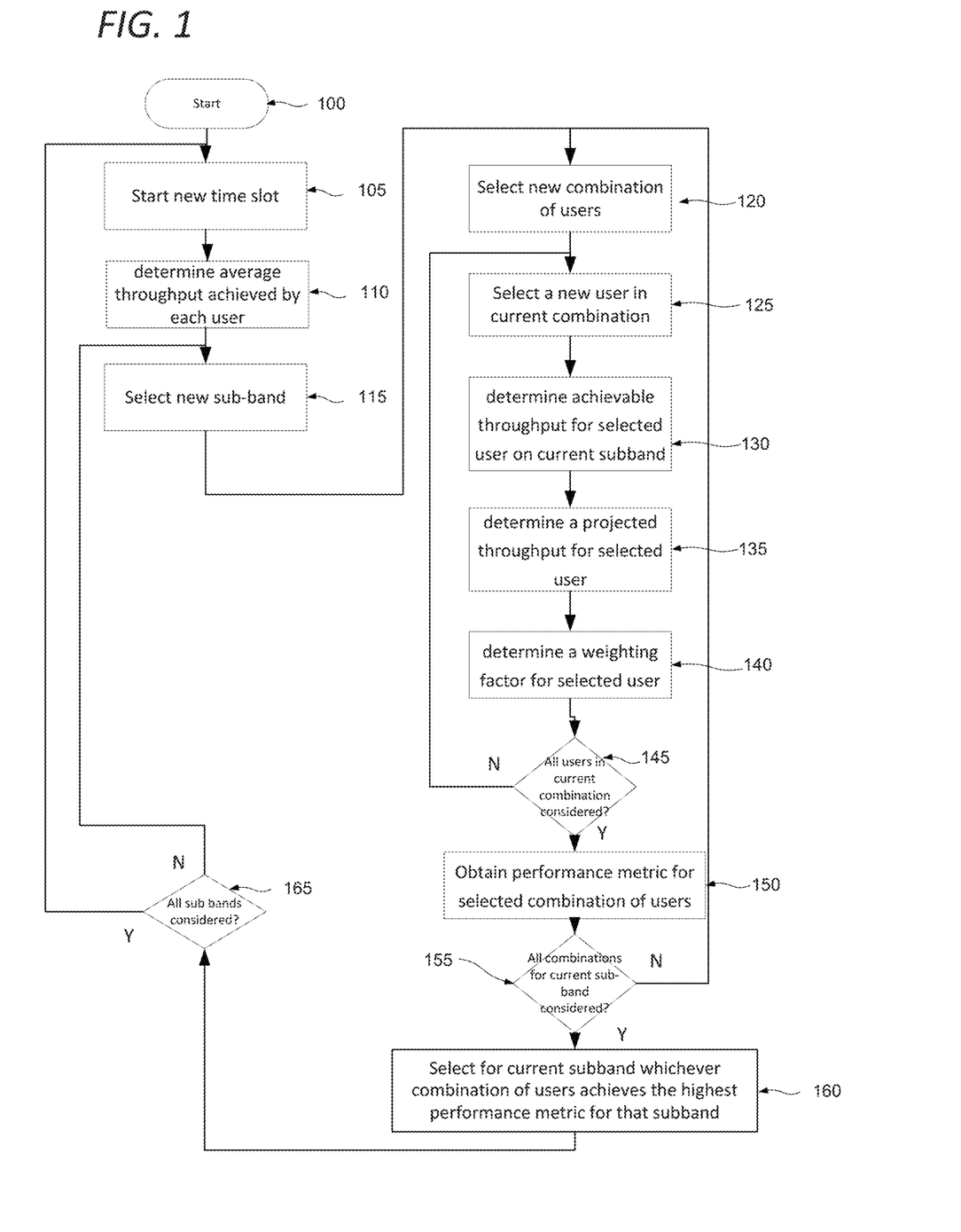
FIG. 1 shows a method of selecting users from a pool of candidate users for allocation to a plurality of sub bands in accordance with an embodiment.

FIG. 1 shows a method of selecting users from a pool of candidate users for allocation to a plurality of sub bands in accordance with an embodiment. Specifically there is provided a method of selecting users from a pool of candidate users U for allocation to a plurality of sub bands in a time slot t in a multiple access communications system.

As shown in FIG. 1, the method starts at step 100 before proceeding to step 105 at which a new timeslot begins. Access is granted following allocation of resources in time and frequency. Allocation is divided into a number of time slots. For each time slot, sub bands are allocated sequentially until the total number of sub bands per time slot is reached.

The method next proceeds to step 110 at which an average throughput $T_k(t)$ achieved by each user over a predefined historical period is determined. A typical length of this historical period may be between 20 and 1000 times the time slot duration, or more particularly in the order of 100 times the time slot duration.

The goal is now to choose, for a given sub band s, a set of users U among a pool of user sets (the cardinality of the user sets is n(s), n(s)=1 in the OMA case, n(s)>1 in the NOMA case).

On this basis, the method next proceeds to step 115 at which a new sub band is selected. The method then proceeds to step 120 at which a particular combination of users is selected for consideration. The method next proceeds to step 125 at which a particular user is selected within the current combination. The method then proceeds to step 130 at which an achievable throughput $R_{s,k|U}(t)$ for each user on the selected sub band in the current time slot t is determined.

In the case s is the first sub band to be allocated in time slot t, $R_{k|U}(t)$, projected throughput for user k in user set U in time slot t is equal to zero.

If s is not the first sub band to be allocated in time slot t and if user k was previously assigned to one or several sub bands, $R_{k|u}(t)$ is non-zero (sum of throughputs on each allocated sub band). If s is not the first sub band to be allocated in time slot t and if user k was not previously assigned any sub bands, $R_{k|U}(t)$ is also zero By comparison, the conventional definition of $T_k(t)$ considers averaging the throughput of user k over a time window until time slot t−1.)

The method then proceeds to step 135 at which a projected throughput equal to the sum of the achievable throughput for the currently selected user on each sub band to which that user has been attributed is determined.

The method next proceeds to step 140 at which the weighting factor $W_{k|U}(t)$ reflecting the difference between the projected throughput determined for the currently selected user in the current selected combination of users within the time slot t and a target throughput $R_{target,k}(t)$ defined for that respective user is determined.

In particular, computation of a weight for each user k in candidate user set U $W_{k|U}(t)=R_{target}(t)-R_{k|U}(t)$ Where $R_{k|U}(t)$ is the projected throughput achieved by user k within timeslot t at the current assignment stage, and $$R_{k|U}(t) = \sum_{s \in S_k} R_{s,k|U}(t) \quad (5)$$

Where $S_k$ is the set of sub bands currently assigned to user k.

It may be noted that when starting the allocation for timeslot t, $S_k$ is empty. Each time user k is allocated to a new sub band, $S_k$ and $R_{k|U}(t)$ are updated accordingly.

The method next proceeds to step 145 at which it is determined whether the weighting factor has been obtained for all users. In a case where it has not, the method reverts to step 125 and steps 130 and 135 are repeated for the next user.

Otherwise, the method proceeds to step 150 at which a performance metric is obtained for the current combination of users for the currently selected sub band by summing across all users in that combination the values obtained by dividing the product of the corresponding achievable throughput value for that user on that sub band and the corresponding weighting factor, by the average throughput achieved by the corresponding user over the predefined historical period. That is to say, the performance metric is given by $$\sum_{k \in U} \frac{R_{s,k|U}(t) \times W_{k|U}(t)}{T_k(t)} \quad (6)$$

The method then proceeds to step 155 at which it is determined whether a performance metric has been obtained for every possible combination of users that may be assigned to the currently selected sub band. In a case where the performance metric has not been obtained for every possible combination of users, the method loops back to step 120 at which the next possible combination is selected, and steps 125, 130, 135, 140, 145 and 150 are repeated for that further possible combination.

Otherwise, the method proceeds to step 160 at which whichever combination of users achieves the highest respective performance metric is selected for assignment to that sub band. The method then proceeds to step 165 at which it is determined whether all sub bands have been considered. If it is determined that all sub bands have not been considered, the method loops back to step 115 at which the next sub band is selected, and steps 120, 125, 130, 135, 140, 145, 150, 155 and 160 are repeated. Otherwise the method loops back to step 105 and the method is repeated for the next time slot.

It will be appreciated that the method of FIG. 1 may be modified in many ways without departing from the underlying conceptual approach. For example, the method is described as a set of nested loops stepping through each user in each possible combination, each combination for each sub band, each sub band for each time slot. Alternatively, certain parts of these loops may be replaced with a parallel processing of each iteration. For example, the combination of users can be processed in parallel. It is additionally observed that the processing of the sub bands may be carried out in any order. Similarly, while at step 145, 155 and 165 the method explicitly determines whether all iterations for a respective loop have been completed, in a real implementation the number of necessary iterations may be known or determined in advance, and the number of loops programmatically fixed as required—this is of course logically equivalent. In some cases, there may be insufficient time or processing capacity to perform the described method for every sub band before transmission in the timeslot under processing must commence. In such a situation, an alternative method may be used for attribution of users to the remaining sub channels, for example reassigning the same users as assigned in the previous time slot, or using a conventional PF metric without weighting, or any other suitable attribution method as may be known from the prior art. Still further, the order of certain steps in the method may be varied. For example, the achievable throughput may be computed for each sub band and each combination of users before an individual sub band and an individual combination of users is selected.

It will be appreciated that step 140 is carried out as described above on the basis that a respective weighting value is used for each user. In other embodiments the same weighting may be used for all users, as discussed in more detail below.

Thus, more generally there is provided a method of selecting users from a pool of candidate users for allocation to a plurality of sub bands in a time slot t in a multiple access communications system, the method comprising the steps of:

determining an average throughput achieved by each user over a predefined historical period, determining an achievable throughput for each user for each possible combination of users on a first sub band in the time slot t, calculating a performance metric for each possible combination of users by:

for each user determining a projected throughput equal to the sum of the achievable throughput for that user on each sub band to which that user has been attributed, determining a weighting factor reflecting the difference between the projected throughput determined for each respective user in the current possible combination of users within the time slot t and a target throughput defined for that respective user, obtaining the performance metric for the current possible combination of users for the first sub band by, for each combination of users, summing across all users in that combination the values obtained by dividing the product of the corresponding achievable throughput value for that user on that sub band and the corresponding weighting factor, by the average throughput achieved by the corresponding user over the predefined historical period, and selecting for the first sub and whichever combination of users achieves the highest respective performance metric for that sub band, and repeating each preceding step for a further sub band until users have been attributed to each sub band.

The described method may be applied in a multiple access communications system implementing a Non Orthogonal Multiple Access (NOMA) system, whereby each possible combination of users comprises a plurality of users. Alternatively the described method may be applied in a multiple access communications system implementing an Orthogonal Multiple Access (OMA) system, whereby each possible combination of users comprises a single user.

Alternatively, the step of calculating a performance metric for each possible combination of users, the average throughput achieved by the corresponding user over a predefined historical period may be taken to be the average throughput achieved by the corresponding user over a predefined historical period preceding the current time slot t.

The weighting factor may be computed as the sum of the difference between the projected throughput determined for each respective user within a current time slot t and a target throughput defined for that respective user across the users (e.g. projected throughput subtracted from target throughput), and the performance metrics for each user are calculated using the same weighting factor.

That is to say, the Proportional Fairness metric $M_{s,k,U}^{NOPF}(t)$ as discussed with regard to equation 4 above is replaced by a weighted metric $$WM_{s,k,U}^{NOPF}(t) = \left(\sum_{k \in U} \frac{R_{s,k|U}(t)}{T_k(t)}\right) \times W(U) = M_{s,k,U}^{NOPF}(t) \times W(U)$$

where weight $W(U)$ is computed as the sum of the weights of users in U $$W(U) = \sum_{k \in U} W_{k|U}(t) \qquad (7)$$

Alternatively, the weighting factor is computed as the difference between the projected throughput determined for each respective user within a current time slot t and a target throughput defined for that respective user (e.g. projected throughput subtracted from target throughput), and the performance metrics for each user are calculated using the respective weighting factor corresponding to that user.

That is to say, $$\sum_{k \in U} \frac{R_{s,k|U}(t)}{T_k(t)}$$

may be replaced with $$\sum_{k \in U} \frac{R_{s,k|U}(t)}{T_k(t)} W_{k|U}(t)$$

In OMA cases the preceding approaches are equivalent.

The target throughput may be fixed as a multiple (b) of the average throughput per user achieved across all sub bands over a second predefined historical period preceding a current timeslot t, where the multiple is any value greater than one.

That is to say, $T_{target}(t) = b \times R_{avg}(t-1)$, with $b>1$

Where $R_{avg}(t-1)$ is the value of the user average throughput computed at time slot t−1.

Optionally, the multiple (b) is defined for each user. Further still, the multiple (b) may be defined for each user from a plurality of predefined service quality levels, each level being associated with a respective value of the multiple. For example, different levels of service may be defined, corresponding to a basic service and one or more additional levels of premium service.

For example, minimum rate values may be fixed for three service levels $R_{basic}$, $R_{silver}$ and $R_{gold}$ as follows:

$$R_{target} = \begin{cases} R_{basic} & \text{if user } k \text{ requests basic service} \\ R_{silver} & \text{if user } k \text{ requests silver service} \\ R_{gold} & \text{if user } k \text{ requests gold service} \end{cases} \quad (8)$$

Figure 2:
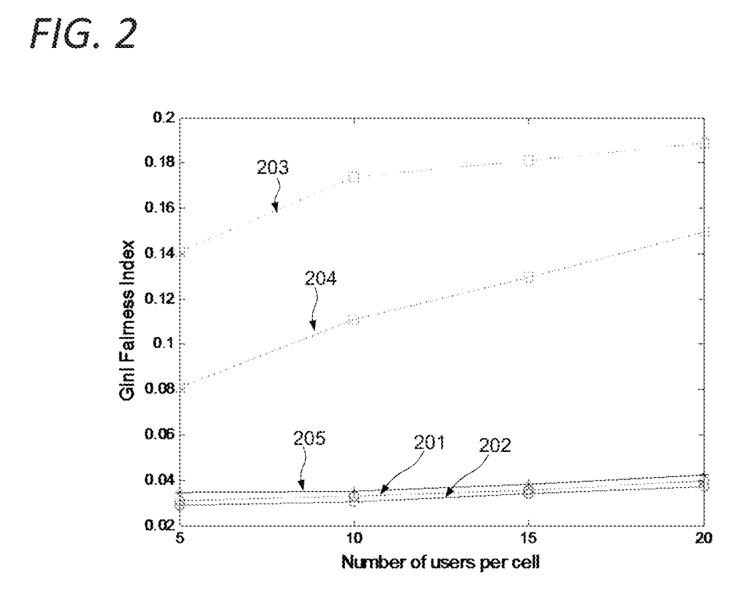
FIG. 2 shows the fairness achieved by certain embodiments in comparison to prior art solutions as a function of the number of users per cell.

FIG. 2 shows the fairness achieved by certain embodiments in comparison to prior art solutions as a function of the number of users per cell. Specifically, FIG. 2 plots the Gini fairness index as described by Dianati, M., Shen, X., Naik, S., in "A new fairness index for radio resource allocation in wireless networks," in *Proc. IEEE Wireless Communication and Networking Conference*, 2005, against the number of users in the wireless communications cell under consideration, where the highest possible level of fairness is 0.

The results include simulations of five user attribution scenarios:

A. orthogonal signaling with conventional PF as described with reference to the technical background above, with one user per sub band (n(s)=1), represented by the line 203.

B. non-orthogonal signaling with conventional PF as described with reference to the technical background above, with two users per sub band (n(s)=2), represented by the line 204.

C. orthogonal signaling with a weighted PF determined in accordance with an embodiment in which the weighting factor is computed as the difference between the projected throughput determined for each respective user within a current time slot t and a target throughput defined for that respective user, and the performance metrics for each user are calculated using the respective weighting factor corresponding to that user, with one user per sub band (n(s)=1), represented by the line 201.

D. non-orthogonal signaling with a weighted PF determined in accordance with an embodiment, in which the weighting factor may be computed as the sum of the difference between the projected throughput determined for each respective user within a current time slot t and a target throughput defined for that respective user across users, and the performance metrics for each user are calculated using the same weighting factor, with two users per sub band (n(s)=2), represented by the line 202.

E. non-orthogonal signaling with distributed weights, where the target throughput is fixed as a multiple (b) of the average throughput per user achieved across all sub bands over a second predefined historical period preceding a current timeslot t, with each user being assigned a respective value of b equal in this simulation to 1.5, and two users per sub band (n(s)=2), represented by the line 205.

This simulation is based on the following rules:

An equal power repartition on all sub bands is assumed: Ps=Pmax/S.

Power is distributed among the users in a sub band according to the FTPA (fractional transmit power allocation) rule.

The total number of users is given by the abscissa of the diagram. For each sub band, all the possible combinations U of 2 users among all the users are considered and the one with the highest metric is kept.

As shown, the fairness achieved by the embodiments C and D is excellent, reflecting a substantial improvement over the results of prior art implementations A and B, for any number of users per cell although the fairness advantage increases as the number of users per cell grows. Implementation E is slightly less fair than C and D, but this is on the basis of support for different service levels as described above, and still dramatically better that the prior art solutions.

Figure 3:
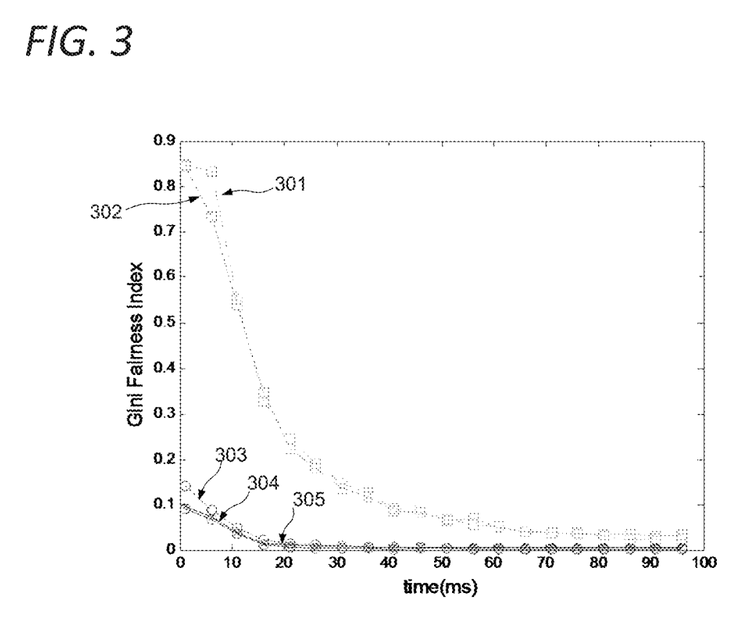
FIG. 3 shows the fairness achieved by certain embodiments in comparison to prior art solutions as a function of time.

FIG. 3 shows the fairness achieved by certain embodiments in comparison to prior art solutions. Specifically, FIG. 3 plots the Gini fairness index against time from the initiation of communications.

FIG. 3 shows the fairness achieved by certain embodiments in comparison to prior art solutions as a time function. The five scenarios described with respect to FIG. 2 are retained for this figure. In particular, scenario A is represented by the line 301, scenario B is represented by the line 302, scenario C is represented by the line 303, scenario D is represented by the line 304, and scenario E is represented by the line 305.

As can be seen, generally speaking and in particular in prior art systems, fairness improves over time. Nevertheless, low latency and constant bandwidth services remain challenged by the time taken to achieve fairness. As shown, scenarios A and B take around 20 ms to achieve 0.2 on the Gini fairness index, Embodiments C, D and E all start below this level, and by 20 ms have achieved almost perfect fairness. This may have corresponding advantages in terms of reduced latency and reduced need for buffering.

Figure 4:
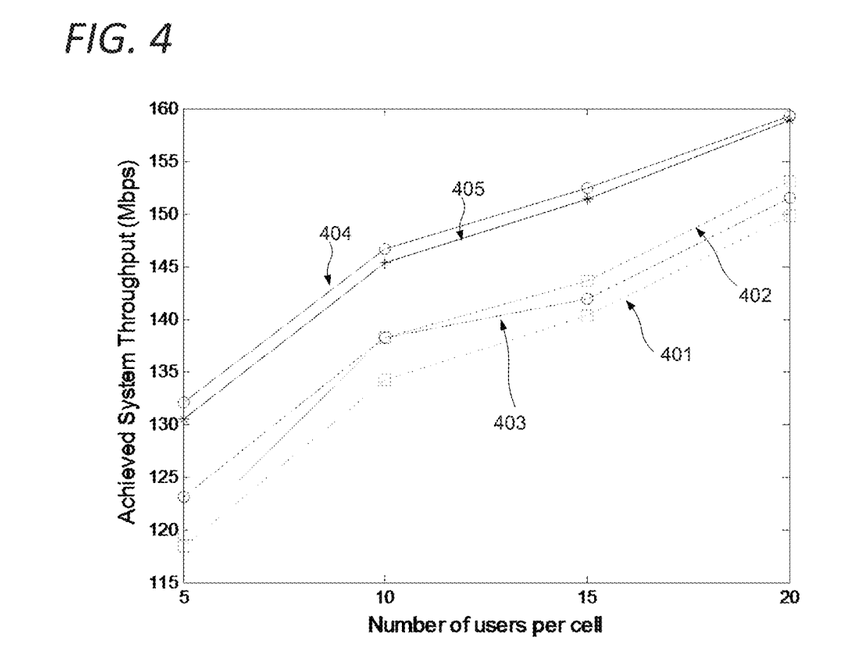
FIG. 4 shows the total throughput achieved by certain embodiments in comparison to prior art solutions as a function of the number of users per cell.

FIG. 4 shows the total throughput achieved by certain embodiments in comparison to prior art solutions as a function of the number of users per cell. The five scenarios described with respect to FIG. 2 are retained for this figure. In particular, scenario A is represented by the line 401, scenario B is represented by the line 402, scenario C is represented by the line 403, scenario D is represented by the line 404, and scenario E is represented by the line 405. As shown, the non-orthogonal embodiments D and E achieve consistently superior throughput as compared to prior art scenarios A and B. The Orthogonal embodiment C achieves slightly better throughput than the prior art orthogonal implementation A, for all numbers of users per cell.

As such in all comparable cases implementations of the present invention bring throughput improvements.

Figure 5:
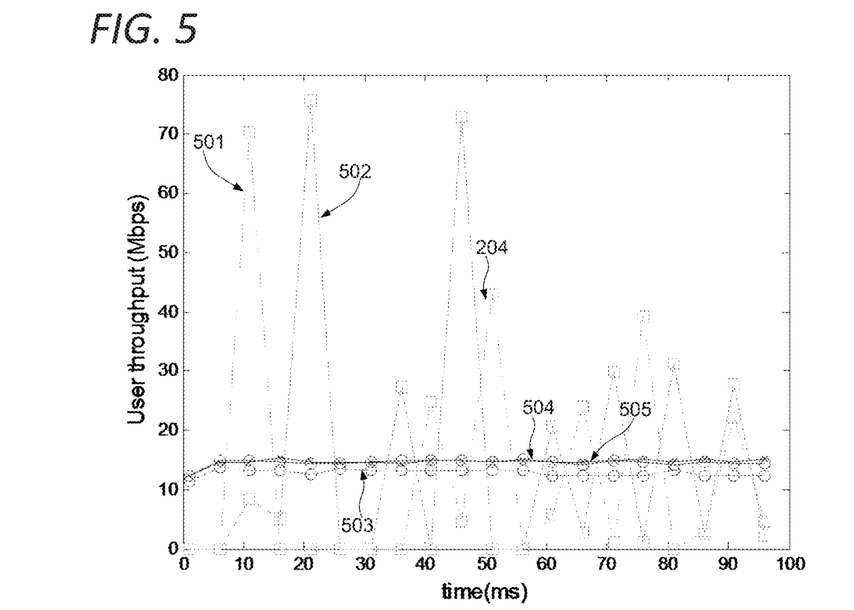
FIG. 5 shows the total user throughput achieved by certain embodiments in comparison to prior art solutions over time.

FIG. 5 shows the total user throughput achieved by certain embodiments in comparison to prior art solutions over time. The five scenarios described with respect to FIG. 2 are retained for this figure, with 10 users per cell. In particular, scenario A is represented by the line 501, scenario B is represented by the line 502, scenario C is represented by the line 503, scenario D is represented by the line 504, and scenario E is represented by the line 505. As shown, while prior art scenarios A and B show wild variations in throughput, embodiments C, D and E show highly stable results. This means that little or no data buffering is required in implementation of the present invention.

There may be provided an apparatus adapted to implement embodiments of the invention. Specifically, there may be provided a user selection apparatus for use in a multiple access communications system for the selection of users from a pool of candidate users for allocation to a plurality of sub bands in a time slot t. The apparatus is adapted to assign to each sub band whichever combination of users maximizes a Proportional Fairness performance metric (as described with reference to equation 4 above for example) for that respective sub band, where the performance metric is weighted by a weighting factor reflecting the difference for each user between a target throughput and an achieved throughput.

The performance metric may correspond to the sum across all users in a respective combination of users of the values obtained by dividing the product of an achievable throughput value for that user on that sub band and a weighting factor reflecting the difference between a projected throughput determined for that user in the current respective combination of users within the time slot t and a target throughput defined for that respective user in the current possible combination, by the average throughput achieved by the corresponding user over a predefined historical period.

Figure 6:
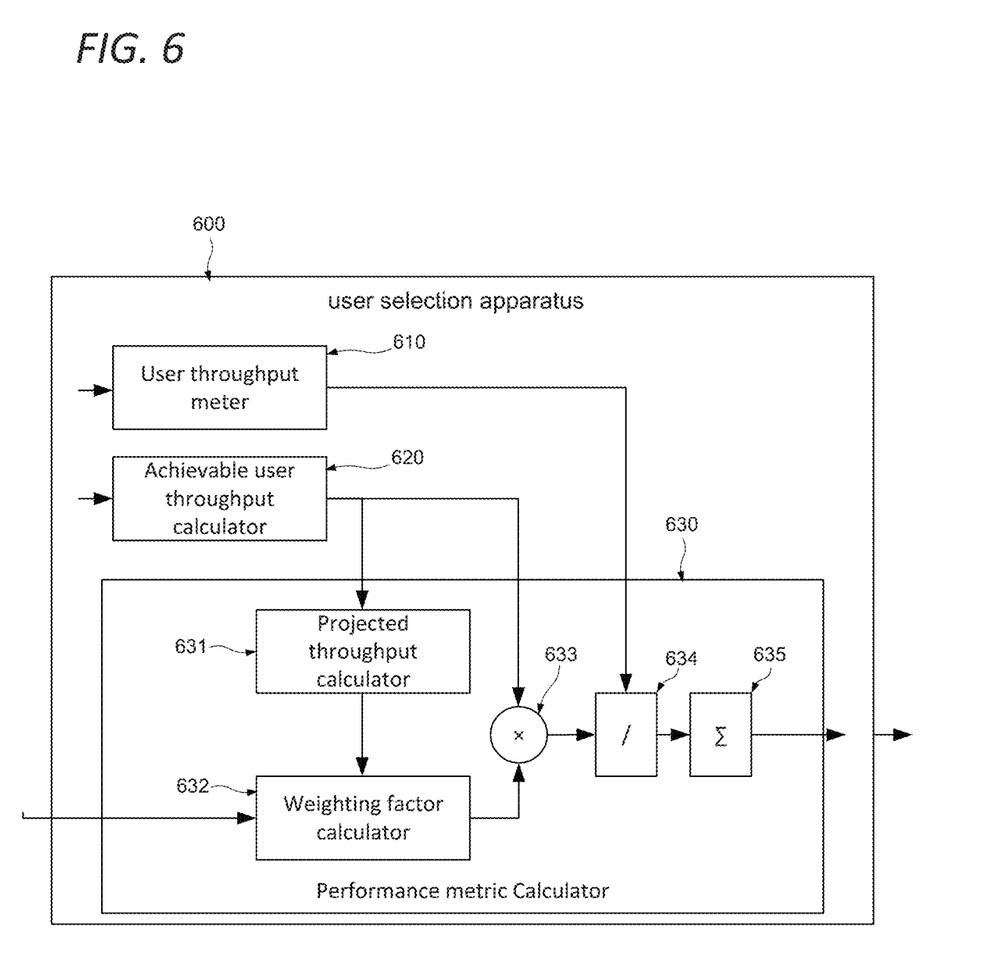
FIG. 6 shows an apparatus implementing an embodiment.

FIG. 6 shows an apparatus implementing an embodiment. As shown in FIG. 6, there is provided a user selection apparatus 600 for use in a multiple access communications system for the selection of users from a pool of candidate users for allocation to a plurality of sub bands in a time slot t. The apparatus 600 comprises a user throughput meter 610, an achievable user throughput calculator 620 and a performance metric calculator 630. The performance metric calculator 630 itself comprises a projected throughput calculator 631, and a weighting factor calculator 632, as well as multiplier 633, divider 634 and accumulator 635.

The user selection apparatus 600 is adapted to provide input values to the user throughput meter, the achievable user throughput calculator and the performance metric calculator to obtain performance metric values permitting the assignment of users to each sub band.

More particularly, the user throughput meter 610 is adapted to determine an average throughput achieved by each user over a predefined historical period.

The achievable user throughput calculator 620 is adapted to determine an achievable throughput for each user of a respective possible user combination on a first sub band in time slot t.

The performance metric calculator is adapted to calculate a performance metric for each possible combination of users, with the support of its sub-components as discussed below.

Specifically, the projected throughput calculator 631 is adapted to determine a projected throughput equal to the sum of the achievable throughput for the user on each sub band to which the user has been attributed, for each user in the current possible combination of users.

The weighting factor calculator 632 is adapted to determine a weighting factor reflecting the difference between the projected throughput determined for each respective user in the current possible combination of users within the time slot t and a target throughput defined for that respective user in the current possible combination by the projected throughput calculator.

The performance metric calculator 630 is adapted to obtain the performance metric for the current possible combination of users for the sub band under consideration by summing in the summer 635 across all users in the combination under consideration the values obtained by dividing in the divider 634 by the product of the corresponding achievable throughput value for that user on that sub band output by the projected throughput calculator 631 and the corresponding weighting factor output by the weighting factor calculator 632 as determined by the multiplier 633, by the average throughput achieved by the corresponding user over the predefined historical period output by the user throughput meter 610.

The user selection apparatus is adapted to then select for the sub band under consideration whichever combination of users achieves the highest respective performance metric output by the performance metric calculator 630 for that sub band.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

These methods and processes may be implemented by means of computer-application programs or services, an application-programming interface (API), a library, and/or other computer-program product, or any combination of such entities.

Figure 7:
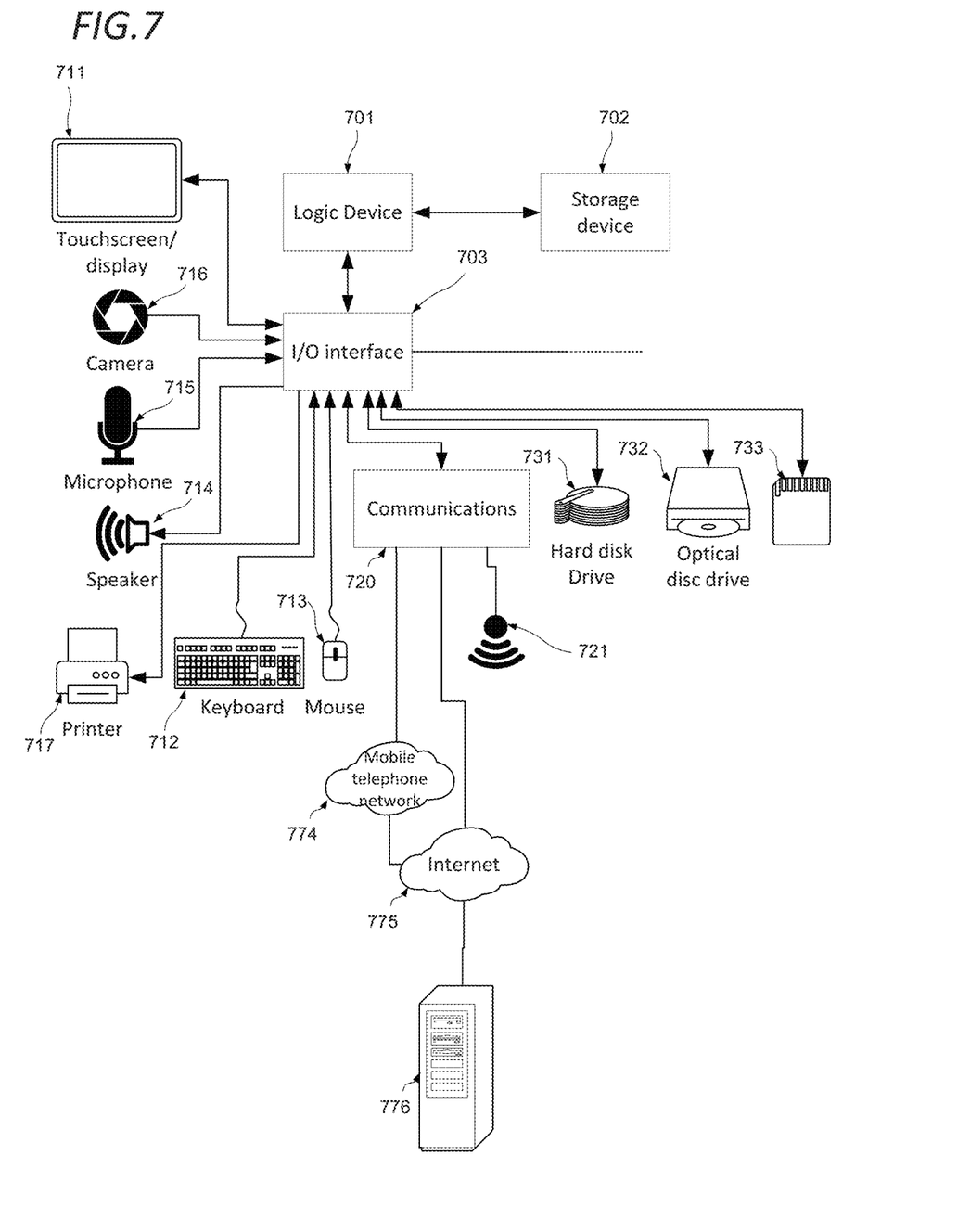
FIG. 7 shows a generic computing system suitable for implementation of embodiments of the invention.

FIG. 7 shows a generic computing system suitable for implementation of embodiments of the invention.

As shown in FIG. 7, a system includes a logic device 701 and a storage device 702. The system may optionally include a display subsystem 711, input/output subsystem 703, communication subsystem 720, and/or other components not shown.

Logic device 701 includes one or more physical devices configured to execute instructions. For example, the logic device 701 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 701 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 701 may optionally be distributed among two or more separate devices, which may be remotely located and/or configured for coordinated processing. Aspects of the logic device 701 may be virtualized and executed by remotely accessible, networked computing devices configured in a cloud-computing configuration.

Storage device 702 includes one or more physical devices configured to hold instructions executable by the logic device to implement the methods and processes described herein. When such methods and processes are implemented, the state of storage 702 device may be transformed—e.g., to hold different data.

Storage device 702 may include removable and/or built-in devices.

Storage device 702 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an I/O interface 703 adapted to support communications between the Logic device 701 and further system components. For example, additional system components may comprise removable and/or built-in extended storage devices. Extended storage devices may comprise one or more types of storage device including optical memory 732 (e.g., CD, DVD, HD-DVD, Blu-Ray Disc, etc.), semiconductor memory 733 (e.g., FLASH RAM, EPROM, EEPROM, FLASH etc.), and/or magnetic memory 731 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 701 and storage device 702 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 7 may be used to implement one or several embodiments of the invention.

For example, a program implementing the steps described with respect to FIG. 1 may be stored in storage device 702 and executed by logic device 701. The user combinations, throughput, weighting factor and/or performance metrics may be buffered in the storage device 702. The Logic device 701 may implement the steps as described above under the control of a suitable program, in particular the throughput, weighting factor and performance metric calculations described above, or may interface with internal and/or external dedicated systems adapted to perform some or all of these processes such as hardware accelerated encoders/decoders and the like. Furthermore, a program may implement a NOMA or OMA transmitter implementing user allocation in accordance with embodiment(s) as described above for example. These tasks may be shared among a number of computing devices, for example as described with reference to FIG. 7. The encoded signal may be received via the communications interface 720.

Accordingly, the invention may be embodied in the form of a computer program.

It will be appreciated that a "service", as used herein, may be an application program executable across multiple user sessions. A service may be available to one or more system components, programs, and/or other services. In some implementations, a service may run on one or more server-computing devices.

When included, display subsystem 711 may be used to present a visual representation of the first video stream, the second video stream or the combined video stream, or may otherwise present statistical information concerning the processes undertaken. As the herein described methods and processes change the data held by the storage device 702, and thus transform the state of the storage device 702, the state of display subsystem 711 may likewise be transformed to visually represent changes in the underlying data. Display subsystem 711 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 712, mouse 713, touch screen 711, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 720 may be configured to communicatively couple computing system with one or more other computing devices. For example, communication module of may communicatively couple computing device to remote service hosted for example on a remote server 776 via a network of any size, including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 774, or a wired or wireless local- or wide-area network. In some embodiments, the communication subsystem may allow computing system to send and/or receive messages to and/or from other devices via a network such as the Internet 775. The communications subsystem may additionally support short range inductive communications 721 with passive devices (NFC, RFID etc).

Figure 8:
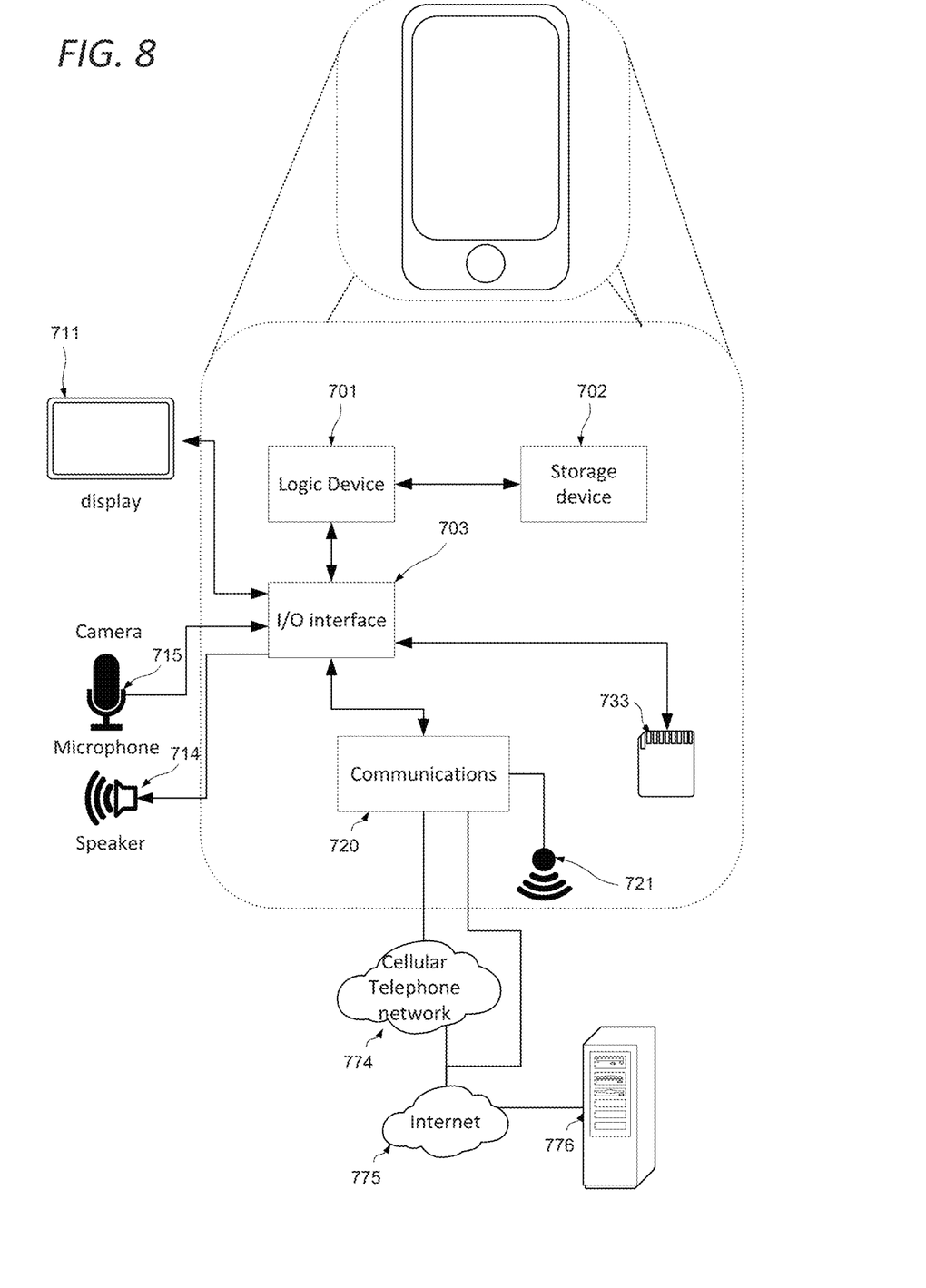
FIG. 8 shows a smartphone device configured to constitute an embodiment.

FIG. 8 shows a smartphone device configured to constitute an embodiment. As shown in FIG. 8, the smartphone device incorporates elements 701, 702, 703, 720, near field communications interface 721, flash memory 733, elements 714, 715, and 711 as described above. It is in communication with the telephone network 774 and/or a server 776 via the network 775. Alternative communication mechanisms such as a dedicated network or Wi-Fi may also be used.

Figure 9:
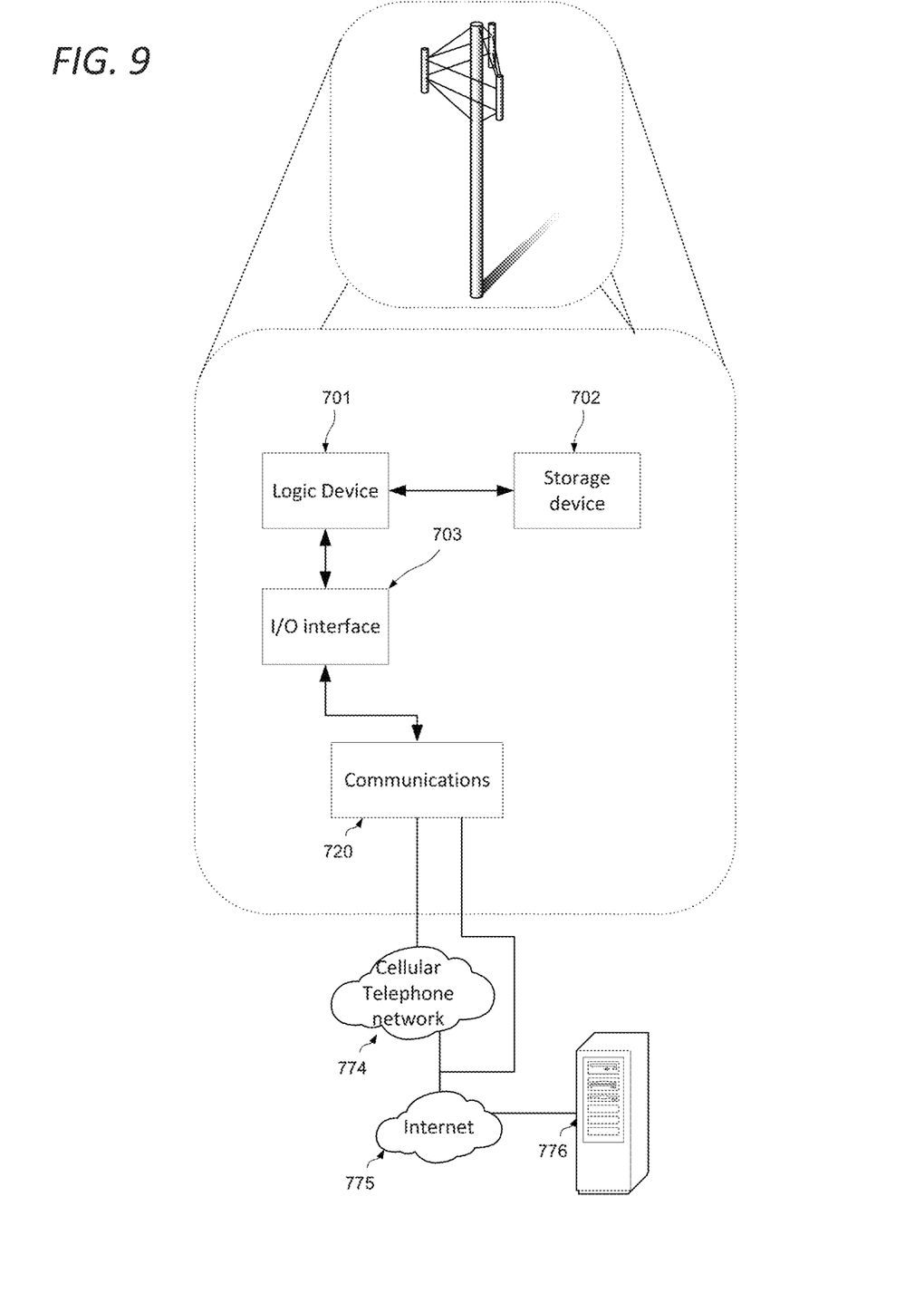
FIG. 9 shows a cellular network base station adaptable to constitute an embodiment.

FIG. 9 shows a cellular network base station adaptable to constitute an embodiment. As shown in FIG. 9, the cellular network base station incorporates elements 701, 702, 703, and 720 as described above. It is in communication with the telephone network 774 and/or a server 776 via the network 775. Alternative communication mechanisms such as a dedicated network or Wi-Fi may also be used.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A user selection apparatus for use in a multiple access communications system for the selection of users from a pool of candidate users for allocation to one or more of a plurality of sub bands in a time slot t, said apparatus comprising at least one memory and one or more processors, the one or more processors being configured to: assign to each said sub band whichever combination of users maximizes a Proportional Fairness performance metric for that respective sub band wherein said performance metric is weighted by a weighting factor reflecting the difference for each user between a target throughput equal to a multiple (b) of the average throughout per user achieved across all sub bands over a predefined historical period preceeding current time slot t, and a projected throughput equal to the sum of the achievable throughputs for each said user on each sub band in current time slot t to which one or more said users had been attributed.

2. The apparatus of claim 1, wherein the one or more processors are further configured to: determine said performance metric by summing across all users in a respective said combination of users of the values obtained by dividing the product of an achievable throughput value for that user on that sub band and the weighting factor by the average throughput achieved by the corresponding said user over a predefined historical period.

3. The apparatus of claim 2, wherein the one or more processors are further configured to select each sub band in said time slot t in turn and to designate this selected sub band to an achievable user throughput calculator and a performance metric calculator, wherein a user throughput meter is adapted to determining said average throughput achieved by each said user over a predefined historical period, said achievable user throughput calculator is adapted to determine said achievable throughput for each said user for each possible combination of users on selected said sub band in said time slot t, said performance metric calculator is adapted to calculate said performance metric for each said possible combination of users, said performance metric calculator comprising:

a projected throughput calculator adapted to determine said projected throughput and a weighting factor calculator adapted to determine said weighting factor reflecting the difference between said projected throughput determined for each respective said user in the current possible combination of users within said time slot t and said target throughput defined for that respective said user in the current possible combination by said projected throughput calculator, and wherein said performance metric calculator is adapted to obtain said performance metric for the current possible combination of users for said selected sub band by summing across all users in that combination the values obtained by dividing the product of the corresponding said achievable throughput value for that user on said selected sub band output by said achievable throughput calculator and the corresponding weighting factor output by said weighting factor calculator, by the average throughput achieved by the corresponding said user over said predefined historical period output by said user throughput meter, said user selection apparatus being further adapted to select for said selected sub band whichever said combination of users achieves the highest respective performance metric output by said performance metric calculator for that sub band, and wherein said user selection apparatus is further adapted to provide input values to said user throughput meter said achievable user throughput calculator and said performance metric calculator to obtain performance metric values permitting the assignment of users to each said sub band.

4. A method for attributing users to one or more of a plurality of sub bands in a time slot t in a multiple access communications system, said method comprising assigning to each said sub band whichever combination of users maximizes a Proportional Fairness performance metric for that respective sub band, wherein said performance metric is weighted by a weighting factor reflecting the difference for each user between a target throughput equal to a multiple (b)

of the average throughput per user achieved across all sub bands over a second predefined historical period preceding current time slot t, and a projected throughput equal to the sum of the achievable throughputs for each said user on each sub band in current time slot t to which one or more said users has been attributed.

5. The method of claim 4 in which said performance metric corresponds to the sum across all users in a respective said combination of users of the values obtained by dividing the product of an achievable throughput value for that user on that sub band and the weighting factor, by the average throughput achieved by the corresponding said user over a predefined historical period.

6. The method of claim 5 further comprising:
  determining an average said achieved throughput by each said user over a predefined historical period,
  determining an achievable throughput for each said user for each possible combination of users on a first said sub band in said time slot t,
  calculating said performance metric for each possible combination of users by:
  for each user, determining said projected throughput,
  determining a weighting factor reflecting the difference between said projected throughput determined for each respective said user in the current possible combination of users within said time slot t and said target throughput defined for that respective said user in the current possible combination,
  obtaining said performance metric for the current possible combination of users for said first sub band by summing across all users in that combination the values obtained by dividing the product of the corresponding said achievable throughput value for that user on that sub band and the corresponding weighting factor, by the average throughput achieved by the corresponding said user over said predefined historical period, and
  selecting for said first sub band whichever said combination of users achieves the highest respective performance metric for that sub band,
  and repeating each preceding step for a further said sub band until users have been attributed to each said sub band.

7. The method of claim 4 in which said multiple access communications system is a Non Orthogonal Multiple Access (NOMA) system and each said possible combination of users comprises a plurality of users.

8. The method of claim 4 in which said multiple access communications system is an Orthogonal Multiple Access (OMA) system and each said possible combination of users comprises a single user.

9. The method of claim 6 wherein at said calculating a performance metric for each possible combination of users the average throughput achieved by the corresponding said user over a predefined historical period is taken to be the average throughput achieved by the corresponding said user over a predefined historical period preceding the current time slot t.

10. The method of claim 4 in which said weighting factor is computed as the sum of the difference between said projected throughput determined for each respective user within a current time slot t and said target throughput defined for that respective said user, across said users in the current possible combination, and the performance metrics for each user are calculated using the same weighting factor.

11. The method of claim 4 in which said weighting factor is computed as the difference between the projected throughput determined for each respective user within a current time slot t and the target throughput defined for that respective said user, and the performance metrics for each user are calculated using the respective weighting factor corresponding to that user.

12. The method of claim 4 in which said multiple (b) is defined for each user.

13. The method of claim 4 in which said multiple (b) is defined for each user from a plurality of predefined service quality levels, each said level being associated with a respective value of said multiple.

14. A computer program product comprising computer instructions stored on a non-transitory storage medium adapted to implement the method of claim 4.

* * * * *